United States Patent [19]
Honeycutt

[11] Patent Number: 5,275,509
[45] Date of Patent: Jan. 4, 1994

[54] METHOD OF DISPOSING OF PHOTOGRAPHIC FIXER AND DEVELOPER

[75] Inventor: Travis W. Honeycutt, Gainesville, Ga.

[73] Assignee: Isolyser Company, Inc., Norcross, Ga.

[21] Appl. No.: 970,268

[22] Filed: Nov. 2, 1992

[51] Int. Cl.$^5$ .............................. B09B 3/00
[52] U.S. Cl. .................... 405/129; 210/710; 210/747; 210/751; 210/912; 588/255
[58] Field of Search ............ 210/702, 710, 719, 751, 210/730, 732, 733, 734, 912, 747; 405/128, 129; 588/255

[56] References Cited

U.S. PATENT DOCUMENTS

| | | | |
|---|---|---|---|
| 4,690,971 | 9/1987 | Flesher | 210/751 |
| 4,791,013 | 12/1988 | Koboshi et al. | 215/6 |
| 4,800,024 | 1/1989 | Elfline | 210/751 |
| 4,876,036 | 10/1989 | Candau et al. | 210/751 |
| 5,132,022 | 7/1992 | Woog | 210/719 |

FOREIGN PATENT DOCUMENTS 53-025270  3/1978  Japan .................... 588/255

*Primary Examiner*—Peter A. Hruskoci
*Attorney, Agent, or Firm*—Malcolm B. Wittenberg

[57] ABSTRACT

A method of disposing of photographic fixer and developer. The fixer and developer, preferably in equal quantities, are mixed and the mixture combined with an absorbing polymer which is substantially insoluble in the mixture of photographic fixer and developer. The polymer is capable of absorbing at least approximately 20 times its weight of the electrolytic aqueous base solution of fixer and developer. Once immobilized, the silver precipitates as insoluble silver sulfide and the mixture can be disposed of in a landfill or similar site designed to receive nontoxic waste.

7 Claims, No Drawings

METHOD OF DISPOSING OF PHOTOGRAPHIC FIXER AND DEVELOPER

TECHNICAL FIELD OF THE INVENTION

The present invention deals with the disposal of photographic fixer and developer which contains a number of toxic components. Upon its immobilization, the combined mixture of fixer and developer can be disposed of in a landfill or similar disposal site designed to receive nontoxic waste.

BACKGROUND OF THE INVENTION

Color and photographic film processing has come into widespread use, particularly in medical facilities where non-invasive x-ray imaging techniques have become a standard diagnostic tool in dentistry, medical and veterinary care. A radiograph or radio sensitive film is a photographic film capable of registering an image when exposed to radiant energy of extremely short wavelength, for example, about 0.0001 the wavelength of light. Radiographic or x-ray film is made of an emulsion (gelatin containing a silver compound) and a transparent, blue tinted base. The base of this photosensitive film is made from a cellulose derivative usually cellulose acetate which provides the desired degree of stiffness and flatness for handling. The sensitive emulsion is made up of many grains or crystals of silver bromide or other silver halide material in a gelatin, and the emulsion is generally coated on both sides of the base.

Upon exposure, the radiosensitive film must be processed to make the image visible and permanent. Processing consists of developing, rinsing, fixing, washing and drying. Accordingly, the film must be placed in a developer solution to convert the invisible image to a visible one composed of minute masses of black metallic silver. After contact with a developer, the film must be rinsed to remove excess developing solution and prevent fixer contamination. Next the film must be placed in a fixing solution to remove the unexposed silver halide therefrom and then be washed again to remove the processing chemicals and prevent eventual discoloration and fading. The film is then dried.

Difficulties are experienced when dealing with disposal of fixer and developer solutions after processing. EPA Regulations 40 CFR §§122 and 403 (Jul. 24, 1990) prohibit developer and fixer fluids from being introduced into waste water treatment systems. These prohibitions are based on two broad areas of contamination. The first contaminant is the silver in fixer fluids. Typical x-ray fluids contain 3.2 or more milligrams of silver per liter of fixer. This is more than 64 times the allowable concentration in waste water of 0.05 milligrams per liter. In fact, the EPA Guide to Pollution Prevention (EPA 625/70-90 CO9, page 5) confirms that photographic chemicals are hazardous materials that should not be discharged into waste water treatment systems even if allowed by local sanitary authorities.

Fixer and developer solutions are also considered "contaminants" in that both the developer and fixer fluids are reactives. The developer fluid is a reducing agent and the reactive fixer is an oxidizing agent. EPA waste water standards prohibit the entry of "reactives" into a waste water treatment facility.

It is thus an object of the present invention to provide a means of "decontaminating" fixer and developer solutions and precipitating the silver ion as silver sulfide, an insoluble and nontoxic form of the metal.

It is yet a further object of the present invention to provide a method of disposing fixers and developers by rendering such solutions nonreactive.

It is yet a further object of the present invention to provide a method for disposing of fixer and developer solutions by immobilizing these solutions and binding them in a system which enables the mixture to be disposed of in a landfill or similar site designed to receive nonhazardous waste.

These and further objects of the present invention will be more readily appreciated with considering the following disclosure and appended claims.

SUMMARY OF THE INVENTION

The present invention is directed to methods of disposing of photographic fixer and developer. In each instance, fixer and developer solutions to be disposed are first mixed together to "react" remaining reactive components in order to at least partially satisfy the requirements contained in the EPA Guide to Pollution Prevention (EPA 625/70-90 CO9, page 5). Once this mixing operation has been carried out, the combined solution is further combined with an absorbing polymer. In its preferred embodiment, the absorbing polymer will encapsulate and bind developer/fixer waste water into a non-toxic solid suitable for incineration or landfill and provide a solid medium for the formation of the insoluble silver sulfide precipitate which is insoluble and nontoxic.

DETAILED DESCRIPTION OF THE INVENTION

As noted previously, fixer and developer solutions which are the direct result of photographic processing represent toxic waste which heretofore has been difficult and costly to dispose of properly. Prior to the recognition of such materials as being environmentally toxic, operators of photographic and x-ray laboratories would simply dispose of spent and excess fixer and developer through municipal sewer systems. However, it has now been recognized that this is not only poor practice but illegal in most communities.

Spent photographic fixer is known to be acidic and a reactive oxidant containing free silver which is also toxic. Spent or used photographic developer is alkaline and is a strong reducing agent. As a reactive, it is also toxic. Both materials are corrosive and would contaminate waste water and would be toxic to the digestive medium at the sewage treatment facility. As such, the mere disposal of such toxics into a municipal sewer facility is not an acceptable disposal method.

The present method begins by mixing spent fixer and developer solutions together preferably in stoichiometrically equal quantities in order to neutralize the activity of each. This further acts to neutralize the pH of each solution to something approaching pH7. The mixing of the fixer and developer will also precipitate the silver ion as silver sulfide, a nontoxic form of the metal.

Once the developer and fixer solutions have been combined, the present method contemplates the introduction of an absorbing polymer which will act to preferably encapsulate and bind the combined developer and fixer solutions into a nontoxic solid suitable for incineration or landfill. After the spent fixer and developer are mixed, the silver first chelates into the polymer then slowly precipitates as the insoluble, non-toxic silver sulfide, a black precipitate.

The absorbent polymer is fundamentally insoluble in the developer/fixer solution. The polymer can be characterized as having a backbone chain capable of chelating the silver ion being reduced or being oxidized to sequester the silver ion, in balancing the pH of the solution and in increasing or decreasing the oxidizing potential of the solution as may be necessary. Obviously, the absorbing polymer's requirements in this regard will depend on the relative amounts of fixer and developer combined in solution. As being illustrative, appendages to the backbone chain can comprise one or more members selected from the group consisting of carboxyl, sulfate and sulfonate groups which are capable of chelation or amide functions which can be oxidized or reduced. Ideally, the polymer can be an acrylic derivative backbone with a mixture of carboxyl and amide copolymer functions.

As a further preferred embodiment, it is contemplated that the absorbing polymer be a polyacrylic acid salt, preferably the aluminum salt or a polyacrylamide or carboxylated cellulose material. It is preferred that the absorbing polymer carry out two functions. In order to practice in the present environment, it should possess the ability to absorb at least 20 times its own weight and preferably 30 to 50 times its own weight of suitable electrolytic aqueous base solutions. The absorbing polymer should also be capable of chelating ionic silver. A suitable commercial product used for practicing the present invention consists of Masorb 5000B which is a cross-linked polyacrylic acid, acrylamide copolymer sold by Mazer Chemical Co.

EXAMPLE 1

A composition was prepared by combining the following constituents:

| Ingredients | Percent | Gross Amount |
|---|---|---|
| Masorb 5000B | 97.8 | 68.46 kg |
| FC171 | 0.5 | 350.00 g |
| Ethanol | 1.6 | 1120.00 g |

The ethanol and surfactant FC171 which is a fluoro surfactant offered by 3M Corp. were mixed first to which the Masorb 5000B was then added. Twenty-two parts of fixer/developer solution were added to one part of the above-recited absorbing polymer mixture and a dark brown solid resulted. As a solid the reaction mixture could be directed toward landfill disposal. The dark brown solid was analyzed for hazardous content and it was determined that the amount of "free" silver and "reactants" were well below those deemed unacceptable by the EPA.

Specifics of the analysis are as follows:

| PARAMETERS | Result | Units | % Spike Recovery |
|---|---|---|---|
| TCLP METALS | | | |
| Arsenic | <0.200 | mg/l | 91.0 |
| Barium | <0.200 | mg/l | 103.0 |
| Cadmium | <0.200 | mg/l | 91.0 |
| Chromium | 0.820 | mg/l | 100.0 |
| Lead | <0.200 | mg/l | 86.0 |
| Mercury | <0.200 | mg/l | 31.0 |
| Selenium | <0.200 | mg/l | 93.0 |
| Silver | 1.16 | mg/l | 464.0 |

-continued

| PARAMETERS | Result | Units | % Spike Recovery |
|---|---|---|---|
| TCLP PESTICIDES | | | |
| Chlordane | <0.03 | mg/l | 80.6 |
| Endrin | <0.02 | mg/l | 136.0 |
| Heptochlor | <0.008 | mg/l | 105.0 |
| Heptaclor Epoxide | <0.008 | mg/l | 120.0 |
| Lindane | <0.400 | mg/l | 114.0 |
| Methoxychlor | <10.00 | mg/l | 160.0 |
| Toxaphene | <0.50 | mg/l | 88.3 |
| TCLP HERBICIDES | | | |
| 2,4,-D | <10.00 | mg/l | 60.0 |
| 2,4,5-TP (Silvex) | <1.00 | mg/l | 70.0 |
| TCLP VOLATILES | | | |
| Benzene | <0.20 | mg/l | 57.5 |
| Carbon tetrachloride | <0.20 | mg/l | 48.6 |
| Chlorobenzene | <0.20 | mg/l | 47.6 |
| Chloroform | <0.20 | mg/l | 69.5 |
| 1,4,-Dichlorobenzene | <0.20 | mg/l | 69.5 |
| 1,2,-Dichloroethane | <0.20 | mg/l | 68.5 |
| 1,1-Dichloroethene | <0.20 | mg/l | 56.5 |
| Methyl ethyl ketone | <0.20 | mg/l | 85.5 |
| Tectrachloroethene | <0.20 | mg/l | 60.0 |
| Trichloroethene | <0.20 | mg/l | 45.6 |
| Vinyl chloride | <0.20 | mg/l | 91.5 |
| TCLP SEMIVOLATILES | | | |
| m+p-Cresol | <4.0 | mg/l | 162.0 |
| o-Cresol | <2.0 | mg/l | 43.0 |
| 2,4,-Dinotrotoluene | <0.13 | mg/l | 74.0 |
| Hexachlorobenzene | <0.13 | mg/l | 67.0 |
| Hexachloro-1,3-butadiene | <0.13 | mg/l | 41.0 |
| Hexachloroethane | <0.13 | mg/l | 39.0 |
| Nitrobenzene | <0.13 | mg/l | 99.0 |
| Pentachlorophenol | <2.0 | mg/l | 60.0 |
| Pyridine | <0.13 | mg/l | 46.0 |
| 2,4,5-Trichlorophenol | <2.00 | mg/l | 61.0 |
| 2,4,6-Trichlorophenol | <2.0 | mg/l | 61.0 |

The same sample was then subjected to the "fathead minnows" test. A 96-hour toxicity test was conducted to determine if the same was acutely toxic to fathead minnows. Title 22, Seciton 66696, Article 11 of the California Code of Regulations requires that an acute toxicity test be performed on water destined for landfill disposal to determine if the waste is acutely toxic to aquatic life at a concentration of 500 mg/l. This test is not presently required in most states.

Test procedures follow the methods prescribed in USEPA (1985) and summarized as follows:

| TEST CONDITIONS FOR FATHEAD MINNOW (Pimephales promelas) Acute Toxicity Tests | |
|---|---|
| 1. Temperature (°C.): | 20 ± 2° C. |
| 2. Ligh quality: | Ambient laboratory illuimination |
| 3. Light intensity: | 50-100 footcandles (ft c) (ambient laboratory levels) |
| 4. Photoperiod: | 8-16 h light/24 h |
| 5. Size of test vessel: | 0.5 L |
| 6. Volume of test solution: | 0/25 L |
| 7. Age of fish: | 11 days |
| 8. No. fish per test vessel: | 10 |
| 9. No. of replicate test vessels per concentration | 2 |
| 10. Total no. organisms per concentration: | 20 |
| 11. Feeding regime: | Feeding not required first 96 h. |
| 12. Aeration: | None |
| 13. Dilution water: | Laboratory prepared water (80% deionized water, 20% Perrier water) |
| 14. Test duration: | 96 Hours |
| 15. Effect measured: | Mortality - no |

-continued

TEST CONDITIONS FOR FATHEAD MINNOW
(Pimephales promelas) Acute Toxicity Tests

| | |
|---|---|
| 16. Test Concentrations: | movement (LC50) 250, 500, and 750 mg/l |

The sample was mechanically homogenized and weighed into pre-tared Erlenmeyer flasks to yield duplicate sample concentrations of 250 mg/l, 500 mg/l, and 750 mg/l. Flasks were mechanically shaken for 6 hours. After shaking, solution were poured into individual glass beakers and the fathead minnows randomly introduced to the test solutions at a loading rate of 0.13 g/l.

Water temperature, dissolved oxygen and pH levels were measured in each test chamber at the start and at 2- our intervals during the test. Initial hardness and a._linity analyses were performed on the dilution water and 750 mg/l test solution. The following results were observed:

| Conc. (mg/l) | | Temp. (°C.) 0 Hrs. | Temp. (°C.) 24 Hrs. | # Dead 24 Hrs | Temp. (°C.) 48 Hrs. | # Dead 48 Hrs. | Temp. (°C.) 72 Hrs. | # Dead 72 Hrs. | Temp. (°C.) 96 Hrs. | # Dead 96 Hrs. | % Mortality |
|---|---|---|---|---|---|---|---|---|---|---|---|
| 0 | A | 21.5 | 21.9 | 0 | 21.8 | 0 | 20.1 | 0 | 20.3 | 0 | 0% |
| | B | | | 0 | | 0 | | 0 | | 0 | |
| 250 | A | 21.3 | 22.0 | 0 | 21.9 | 0 | 19.9 | 1 | 20.1 | 1 | 5% |
| | B | | | 0 | | 0 | | 0 | | 0 | |
| 500 | A | 20.8 | 22.1 | 0 | 22.0 | 0 | 19.9 | 0 | 20.3 | 0 | 0% |
| | B | | | 0 | | 0 | | 0 | | 0 | |
| 750 | A | 21.2 | 22.1 | 0 | 22.0 | 0 | 22.0 | 0 | 20.2 | 0 | 0% |
| | B | | | 0 | | 0 | | 0 | | 0 | |

As the table indicates, the sample which was tested demonstrated no toxic effect on fish per the California Code criteria.

I claim:

1. A new method of disposing of an electrolytic aqueous base solution of photographic fixer and developer containing ionic silver comprising mixing the photographic fixer and developer together with an absorbing polymer which acts to encapsulate and blend the fixer and developer into a solid including nontoxic silver sulfide capable of incineration or landfill disposal, said absorbing polymer being further characterized as being capable of (1) absorbing at least twenty times its own weight of said electrolytic aqueous base solution and (2) chelating ionic silver, said absorbing polymer possessing a backbone chain with appended groups, said groups comprising one or more members selected from the group consisting of carboxyls, sulfates, sulfonates, and amides, wherein said absorbing polymer is substantially insoluble in the mixture of photographic fixer and developer, and disposing of said solid by incineration or by deposit in a landfill site.

2. The method of claim 1 wherein said absorbing polymer is characterized as possessing a backbone chain with appended amide groups capable of being oxidized or reduced when mixed with said mixture of photographic fixer and developer.

3. The method of claim 1 wherein said absorbing polymer is characterized as possessing an acrylic derivative backbone structure having a mixture of carboxyl and amide copolymer functions.

4. The method of claim 1 wherein said absorbing polymer comprises a polyacrylic acid salt.

5. The method of claim 4 wherein said absorbing polymer comprises a polyacrylic acid aluminum salt.

6. The method of claim 1 wherein said absorbing polymer comprises a polyacrylamide.

7. The method of claim 1 wherein said absorbing polymer comprises a carboxylated cellulose material.

* * * * *